(12) United States Patent
Feger et al.

(10) Patent No.: US 7,404,829 B1
(45) Date of Patent: Jul. 29, 2008

(54) ELECTRODE-SEPARATOR COMBINATION FOR IMPROVED ASSEMBLY OF LAYERED ELECTROLYTIC CAPACITORS

(75) Inventors: Christopher R. Feger, Clemson, SC (US); Timothy R. Marshall, Pickens, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 210 days.

(21) Appl. No.: 11/423,604

(22) Filed: Jun. 12, 2006

(51) Int. Cl.
*H01G 9/00* (2006.01)

(52) U.S. Cl. .................. 29/25.03; 438/250; 438/253; 438/387; 438/393; 438/396

(58) Field of Classification Search ............... 438/190, 438/210, 250, 387, 393; 361/504, 508, 512; 29/25.03

See application file for complete search history.

(56) References Cited

U.S. PATENT DOCUMENTS

| | | | |
|---|---|---|---|
| 4,400,452 A * | 8/1983 | Bruder | 429/152 |
| 4,830,940 A | 5/1989 | Keister et al. | |
| 5,147,737 A | 9/1992 | Post et al. | |
| 5,370,663 A | 12/1994 | Lin | |
| 5,439,760 A | 8/1995 | Howard et al. | |
| 5,450,279 A * | 9/1995 | Yoshida et al. | 361/502 |
| 5,822,177 A | 10/1998 | Popp et al. | |
| 6,006,133 A | 12/1999 | Lessar et al. | |
| 6,110,233 A | 8/2000 | O'Phelan et al. | |
| 6,249,423 B1 | 6/2001 | O'Phelan et al. | |
| 6,493,212 B1 | 12/2002 | Clarke et al. | |
| 6,587,329 B1 | 7/2003 | Feger | |
| 6,819,544 B1 | 11/2004 | Nielsen et al. | |
| 6,833,987 B1 | 12/2004 | O'Phelan | |
| 6,881,232 B2 | 4/2005 | O'Phelan et al. | |
| 2002/0034062 A1 | 3/2002 | O'Phelan et al. | |
| 2003/0088293 A1 | 5/2003 | Clarke et al. | |
| 2004/0105212 A1 | 6/2004 | O'Phelan et al. | |
| 2004/0120099 A1 | 6/2004 | Elliott et al. | |
| 2004/0240155 A1 | 12/2004 | Miltich et al. | |
| 2005/0117277 A1 | 6/2005 | Norton et al. | |

FOREIGN PATENT DOCUMENTS

| | | |
|---|---|---|
| WO | 9505663 A1 | 2/1995 |
| WO | 9954896 A1 | 10/1999 |
| WO | 9959174 A1 | 11/1999 |

* cited by examiner

*Primary Examiner*—Scott B. Geyer
*Assistant Examiner*—Kyoung Lee
(74) *Attorney, Agent, or Firm*—Steven M. Mitchell (57) ABSTRACT

This disclosure provides methods for assembling multiple anode stacked capacitor configurations with a temporary adhesive to aide in the alignment of separator materials and electrodes without sacrificing energy density, and electrolytic capacitors comprising such configurations. The temporary adhesive for use in the electrode assemblies will preferably comprise a polymer that is substantially soluble in a solvent-based electrolyte for use in an electrolytic capacitor.

20 Claims, 6 Drawing Sheets

ELECTRODE-SEPARATOR COMBINATION FOR IMPROVED ASSEMBLY OF LAYERED ELECTROLYTIC CAPACITORS

BACKGROUND OF THE INVENTION

1. Field of the Invention

Electrolytic capacitors and, more particularly, a method for assembling multiple anode stacked capacitor configurations with a temporary adhesive, to aide in the alignment of separator materials and electrodes without sacrificing energy density, and electrolytic capacitors comprising such configurations.

2. Background of the Invention

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is generally used for the anode plates, other metals such as tantalum, magnesium, titanium, niobium, zirconium and zinc may be used. Flat constructions for aluminum electrolytic capacitors are known, comprising a planar, layered, stack structure of electrode materials with separators interposed therebetween and connections between the various anode and cathode layers made via tabs on each individual electrode layer.

The need for high voltage, high energy density capacitors is most pronounced when employed in implantable cardiac defibrillators. Since the capacitance of an electrolytic capacitor is provided by the anodes, a clear strategy for increasing the energy density in the capacitor is to minimize the volume taken up by paper and cathode and maximize the number and volume of the anodes. For example, a multiple anode flat, stacked capacitor configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. In order to achieve higher energy densities, three, four and five anodes can be stacked per layer. Maximization of the anode volume may also be accomplished by etching to achieve more effective anode surface area, and making the relative size of the anode plates larger with respect to the cathode plates.

In optimizing flat stack capacitors, the tolerances of the individual components are necessarily tight. In order to achieve such tight tolerances but maintain physical separation between the anode and cathode electrodes during assembly, alignment features such as edge feet, notches, and holes are often placed on the active electrodes. These features perform their desired alignment functions adequately, but subtract material from the electrode that could be used to further optimize energy density. Alternate methods require tails on the electrodes that will subsequently be removed upon assembly into a capacitor case. These methods are sufficient for initial assembly, but do not guarantee that slippage will not occur once the smaller electrode is freed from the tail during the remaining assembly steps.

Once assembled, the tight compression of the case around the stack will prevent any further slippage. However, if an electrode is allowed to slip and become unaligned with respect to the separator and/or an alternate electrode during assembly, a short path can easily develop compromising the component's ability to store energy. Therefore, what is needed is an improved method of assuring alignment of separator materials and electrodes during the assembly of flat stack capacitors.

SUMMARY OF THE INVENTION

This disclosure provides methods for assembling multiple anode stacked capacitor configurations with a temporary adhesive to aide in the alignment of separator materials and electrodes without sacrificing energy density, and electrolytic capacitors comprising such configurations. The temporary adhesive for use in the electrode assemblies will preferably comprise a polymer that is substantially soluble in a solvent-based electrolyte for use in an electrolytic capacitor, such as poly(ethylene glycol) or poly(vinyl alcohol).

In one embodiment, at least one electrode is disposed between a first separator material and a second separator material and a temporary adhesive is applied to the first and second separator materials, whereby the first separator material and the second separator material are temporarily bonded to each other at least one point by the temporary adhesive. The process may further comprise impregnating the electrode assembly with an ethylene glycol based electrolyte, wherein the temporary adhesive is substantially dissolved.

In a second embodiment, at least one electrode is disposed between a first separator material and a second separator material and a temporary adhesive is applied between the first separator material and the at least one electrode and between the second separator material and the at least one electrode, whereby the first separator material is temporarily bonded to the at least one electrode at least one point and the said second separator material is temporarily bonded to the at least one electrode at least one point by the temporary adhesive. The process may further comprise impregnating the electrode assembly with an ethylene glycol based electrolyte, wherein the temporary adhesive is substantially dissolved.

In a third embodiment, a first separator material is disposed adjacent a flat cathode foil and a temporary adhesive is applied to the first separator material, whereby the first separator material is temporarily bonded to the flat cathode foil at least one point by the temporary adhesive. A second separator material is disposed adjacent the flat cathode foil and opposite the first separator material, such that the flat cathode foil is disposed between the separator materials and a temporary adhesive is applied to the second separator material, whereby the second separator material is temporarily bonded to the flat cathode foil at least one point by the temporary adhesive. The flat cathode foil and the separator materials thereby create an enclosed cathode assembly. At least one flat anode foil is disposed adjacent the enclosed cathode assembly, wherein the separator materials prevent the at least one flat anode foil from contacting the flat cathode foil, wherein the flat anode foil and the enclosed cathode assembly creates a flat stacked capacitor construction. The process may further comprise placing the flat stacked capacitor construction in a housing and impregnating the flat stacked capacitor construction with an ethylene glycol based electrolyte, wherein the temporary adhesive is substantially dissolved.

DETAILED DESCRIPTION OF THE INVENTION

While specific configurations and arrangements are discussed, it should be understood that this is done for illustrative purposes only. A person skilled in the relevant art will recognize that other configurations and arrangements can be used. It will also be apparent to a person skilled in the relevant art that the various embodiments disclosed herein can be employed in a variety of other devices and applications.

It should be understood that the spatial descriptions (e.g., "above," "below," "up," "down," "top," "bottom," etc.) have their normal meanings in the art, and are used herein for purposes of illustration only, and that the embodiments disclosed herein can be spatially arranged in any orientation or manner.

Figure 1:
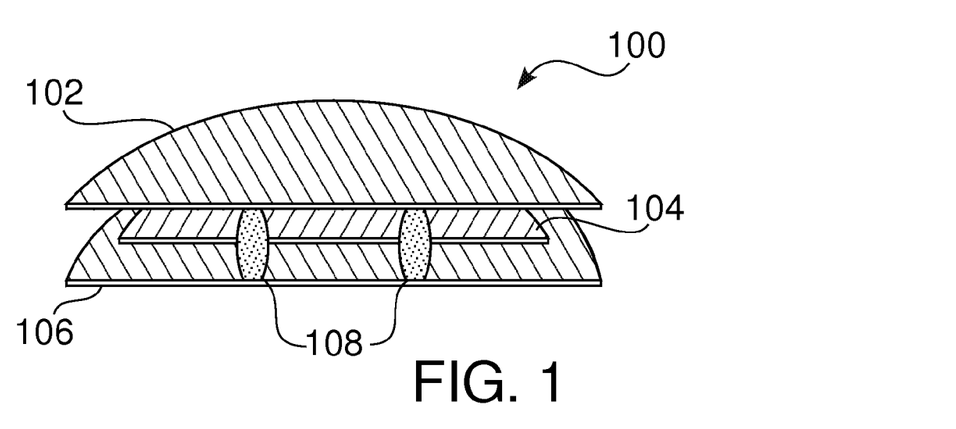
FIG. 1 shows an electrode assembly comprising sheets of separator material temporarily bonded to each other.

FIG. 1 shows an electrode assembly 100 comprising an electrode 104 disposed between a top separator layer 102 and a bottom separator layer 106. Temporary bonds 108 comprise a sufficient amount of temporary adhesive so as to bond the two separator layers, 102 and 106, to each other. The phrase a "sufficient amount of temporary adhesive" means that the amount of adhesive bonds the separators to each other (and/or to the electrode(s)) such that the layers remain bonded during assembly, manufacturing and handling of the electrode assemblies 100. A "sufficient amount of temporary adhesive" can be readily determined by the skilled artisan, and will generally consist of a volume of temporary adhesive on the order of tens to hundreds of microliters. While temporary bonds 108 are represented as two distinct bonds, any number and configuration of temporary bonds can be used to bond the two separator layers to each other. In suitable embodiments, a continuous, or relatively continuous, layer or bead of temporary adhesive is applied to the edges of the separator layers to bond the two layers together. In other embodiments, for example as shown in FIG. 1, a single, or multiple, individual bonds are used to bond the two layers together. While in suitable embodiments, two layers of separator material, 102, 106, are used to enclose electrode 104, the ordinarily skilled artisan will readily recognize that any number of separator layers can be used. The terms "layer" and "material" are used interchangeably throughout to refer to the sections of separator material that are utilized in the various methods and capacitor configurations discussed throughout.

By sandwiching electrode 104 between two layers of separator material, 102, 106, and then temporarily bonding the separator layers to each other, the electrode is suitably covered by separator material such that concern of contact with other external electrodes is virtually eliminated. Thus, electrode assembly 100 can then be utilized in stacked capacitor configurations, as described throughout, without concern of the separator layers 102, 106, slipping or moving away from electrode 104 such that the electrode can be contacted by other external electrodes resulting in a short. The use of such assemblies allows for alignment of the various components of an electrolytic capacitor without the need for alignment holes, notches, or other alignment features in the electrodes or separator layers (though such features can be used with the various assemblies disclosed herein).

Electrode 104 can comprise a single electrode, or a plurality of electrodes, e.g., 2, 3, 4, 5, 6, 7, 8, 9, 10, etc., electrodes. In certain embodiments, electrode 104 will be a metal foil cathode. In other embodiments, electrode 104 will be an anode foil, or a plurality of anode foils. In embodiments where anode foils are used, the anodes can be folded anode assemblies as disclosed in U.S. patent application Ser. No. 11/244,956, filed Oct. 5, 2005, the disclosure of which is incorporated herein by reference in its entirety.

Cathode foils for use in the assemblies can be produced from any suitable material, such as conductive metals, e.g., aluminum and titanium. Cathode foils disclosed throughout can be produced by any suitable method, such as laser cutting, dye cutting and the like.

Anode foils for use in the assemblies, and as disclosed throughout, can be produced by any suitable method, such as laser cutting, dye cutting and the like. Such anode foils can comprise any suitable material known in the art for use in electrolytic capacitors. Aluminum foil is one example of a material for use as anode foils because of its ability to produce a sufficient quality oxide layer, its conductive properties, and its wide commercial availability. Other metal foils conventionally utilized in electrolytic capacitors may also be used, including titanium, tantalum, magnesium, niobium, zirconium and/or zinc. For example, a strip of unetched, high purity (99.99%) aluminum foil with high cubicity, wherein at least 85% of the crystalline aluminum structure is oriented in a normal position (i.e., a (1,0,0) orientation) relative to the surface of the foil, can be used. Such foils are well-known in the art and are readily available from commercial sources.

In certain embodiments, the anode foils (or cathode foils) may be etched to increase surface area, such as in an aqueous halide based etch solution, typically a hydrochloric acid or sodium chloride solution, according to a conventional etch process. For example, U.S. Pat. No. 5,715,133 to Harrington et al. describes a suitable method of etching foil, the disclosure of which is incorporated herein by reference in its entirety. The etch solution can consist of about 1.3% by weight sodium chloride, about 3.5% by weight sodium perchlorate, about 0.35% sodium persulfate, and deionized water. The etch solution is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/cm$^2$ is passed through the foil during the etching process, which requires an etch time in the range of about 2 minutes to about 12 minutes.

The etched foil is then removed from the etch solution and rinsed in deionized water. The tunnels formed during the initial etch are then widened, or enlarged, in a secondary etch solution, typically in an aqueous based nitrate solution between about 1% to about 20% aluminum nitrate, or between about 10% to about 14% aluminum nitrate, with less than about 1% free nitric acid. The etch tunnels are widened to an appropriate diameter by methods known to those in the art, such as those disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer is formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in a greater amount of charge leaking out of the capacitor once it has been charged.

The formation process may consist of applying a voltage to the foil through an electrolyte such as boric acid and water or other solutions familiar to those skilled in the art, resulting in the formation of an oxide on the surface of the anode foil. An example electrolyte for formation is a 100-1000 μS/cm, e.g., 500 μS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

Temporary bonds 108, as disclosed throughout, will comprise an appropriate amount of temporary adhesive so as to temporarily bond the separator layers to each other (or to the electrode as described throughout). Temporary adhesive for use in the electrode assemblies can comprise any suitable adhesive, such as polymeric adhesives. The temporary adhesive for use in the electrode assemblies will preferably comprise a polymer that is substantially soluble in a solvent-based electrolyte for use in an electrolytic capacitor. As used herein the term "substantially soluble" means that the temporary adhesive dissolves in a solvent-based electrolyte to an extent that greater than about 99% of the initial amount of adhesive that was used to bond the separator layers has dissolved into the electrolyte solution. In more suitable embodiments, the temporary adhesive will dissolve into the electrolyte to an extent that greater than about 99.9% to about 100% of the initial amount of adhesive has dissolved into the electrolyte solution.

Suitable polymers for use as temporary adhesives include, but are not limited to poly(ethylene glycol) (PEG) and poly (vinyl alcohol), though any polymeric adhesive that is soluble in the capacitor electrolyte can be used. The molecular weight of the polymer should be selected as to ensure that the polymer is liquid at a temperature at which the adhesive can be manipulated and applied to the separator layers, but solidify at or near room temperature so that the temporary bond is formed and maintained during assembly, manufacturing and handling. For example, the polymer should have a melting temperature in the range of about 20° C. to about 60° C. Suitable molecular weight PEG includes, but is not limited to, PEG between about 500-6000 MW, or more suitably PEG of 600 MW ($T_m$=20-25° C.) or 900 MW ($T_m$=32-36° C.), e.g., from Sigma-Aldrich.

As discussed throughout, when the temporary adhesives utilized in the electrode assemblies are placed in a solvent-based electrolyte, the temporary bond dissolves such that at least greater than about 99% of the adhesive dissolves into the electrolyte. Thus, the bond that was temporarily adhering the two separator layers to each other, and/or the layers to the electrode, will dissolve into the electrolyte solution. As the solvent in the electrolyte and the polymeric adhesive are composed of the same material (or compatible materials), the dissolution of the adhesive into the electrolyte will not contaminate or pollute the electrolyte. As discussed throughout, a suitable electrolyte for use with electrolytic capacitors is ethylene glycol. By matching the adhesive composition with the solvent (i.e., PEG adhesive, ethylene glycol solvent), the adhesive will dissolve into the electrolyte and rather than contaminate or weaken the conductivity of the electrolyte, may actually enhance the scintillation voltage, provided that a small amount of adhesive is used (i.e. on the order of tens to hundreds of microliters).

Separator layers 102 and 106 can comprise any suitable material for use as a separator/spacer in electrolytic capacitors. Suitable materials will be permeable to the electrolyte so as to allow dissolved ions in the electrolyte solution to pass through the materials and contact the surface of the anode or cathode foils, thereby allowing current to pass between the anode and cathode. Separator layers 102 and 106 provide the separation required to insulate the cathodes from adjacent anodes, as well as the metallic surface of the surrounding housing or case used in a stacked capacitor configuration.

Example materials that can be used as separator layers/materials include, but are not limited to, polymeric materials and paper. For example, paper such as Kraft paper, can be used as separator layers 102 and 106. Polymeric materials that can be used as separator layers include, but are not limited to, polypropylene (PP), polyethylene (PE), polypropylene-polyethylene copolymers (e.g. PP/PE/PP), polyimides, polyamide imides, polyether imides, polysulfones, polyether sulfones, polyaryl sulfones, polyether ketones, polyether ether ketones, polyphenylene sulfides and polyarylates. Additional polymeric materials include those discussed in U.S. Pat. No. 6,527,955, incorporated herein by reference in its entirety. In example embodiments, the polymeric materials utilized as separator layers can be polyethylene (e.g. TONEN® 25, available from Tonen Corp., Japan) or polyethylene-polypropylene copolymers (e.g. CELGARD® 2300 (PP/PE/PP) and CELGARD® 4560, available from Celgard LLC, Charlotte, N.C.) as discussed in European Patent Application EP 1 296 389, the disclosure of which is incorporated herein by reference in its entirety.

As used herein, the terms "disposed" and "disposed adjacent" are used to mean that the electrodes (e.g. anodes, cathodes) and the separator layers (or other assembly components as appropriate (e.g., anodes and enclosed cathodes)) are arranged next to each other such that the metallic films are capable of acting as capacitors and such that the separator layers provide separation between the metallic components so as to not create a short. The terms "disposed," "disposed adjacent" and "layered" are all used interchangeably herein. For example, FIG. 1 shows two separator layers 102 and 106, disposed on electrode 104, thus creating a "sandwiching" of the electrode between the two separator layers.

While any suitable shape of the various components of the electrode assemblies can be used, half-circle shaped anode and cathode foil sections, as well as separator layers, provide for a maximum area of cathode and anode foils to be placed in an electrolytic capacitor housing (see below). The shapes of the various components, however, can be modified by those skilled in the art to work with other configurations or capacitor housings, such as circular, square, rectangular, triangular and the like.

Figure 2:
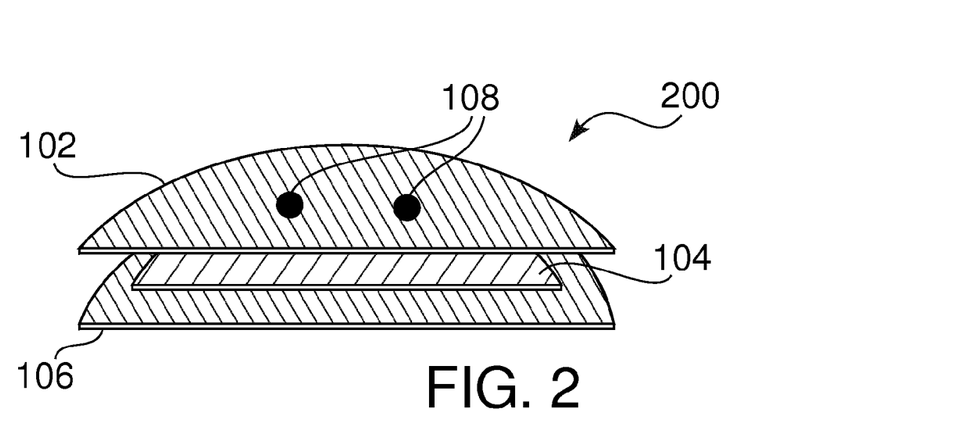
FIG. 2 shows an electrode assembly comprising sheets of separator material temporarily bonded to an electrode.

In another embodiment, FIG. 2 shows an electrode assembly 200 comprising an electrode 104 disposed between a top separator layer 102 and a bottom separator layer 106. Temporary bonds 108 in this embodiment bond separator layers 102 and 106 directly to electrode 104. While two temporary bonds 108 are shown in FIG. 2, the ordinarily skilled artisan would readily understand that any number and shape of bonds can be utilized. As discussed throughout, generally the total volume of temporary adhesive to create temporary bonds 108 will be on the order of tens to hundreds of microliters.

Temporary bonds 108 between separator layers 102 and 106 and electrode 104 can be generated using any suitable method. In one embodiment, a separator layer is disposed adjacent an electrode and volume of molten temporary adhesive (i.e., at a temperature greater than the melting temperature of the polymer) is applied to the separator layer such that it seeps through the separator material, onto the electrode, and temporarily bonds the separator to the electrode. A second separator layer can then be bound to the electrode, opposite the first, in a similar manner. In another embodiment, the molten adhesive can be placed on the electrode and then the separator layer placed in contact with the electrode surface, thus allowing the separator and electrode to bond. If the electrode comprises alignment holes, or other alignment notches, temporary adhesive can be applied through such holes to the separator material that has been disposed adjacent the electrode.

Figure 3:
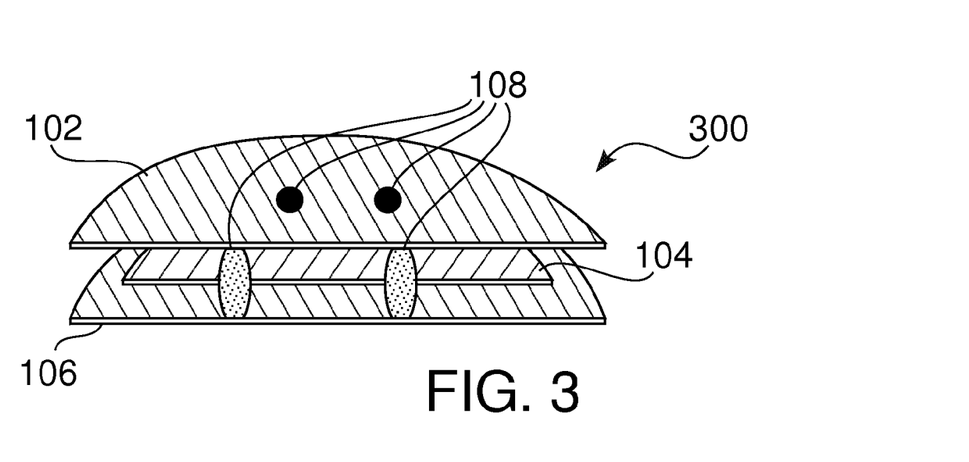
FIG. 3 shows an electrode assembly comprising sheets of separator material temporarily bonded to each other and also temporarily bonded to an electrode.

In another embodiment, as shown in FIG. 3, temporary bonds 108 can bond both the separator layers 102 and 106 to each other, as well as to electrode 104. Temporary bonds 108 as shown in FIG. 3 can be formed in any order as determined by the skilled artisan.

Figure 4:
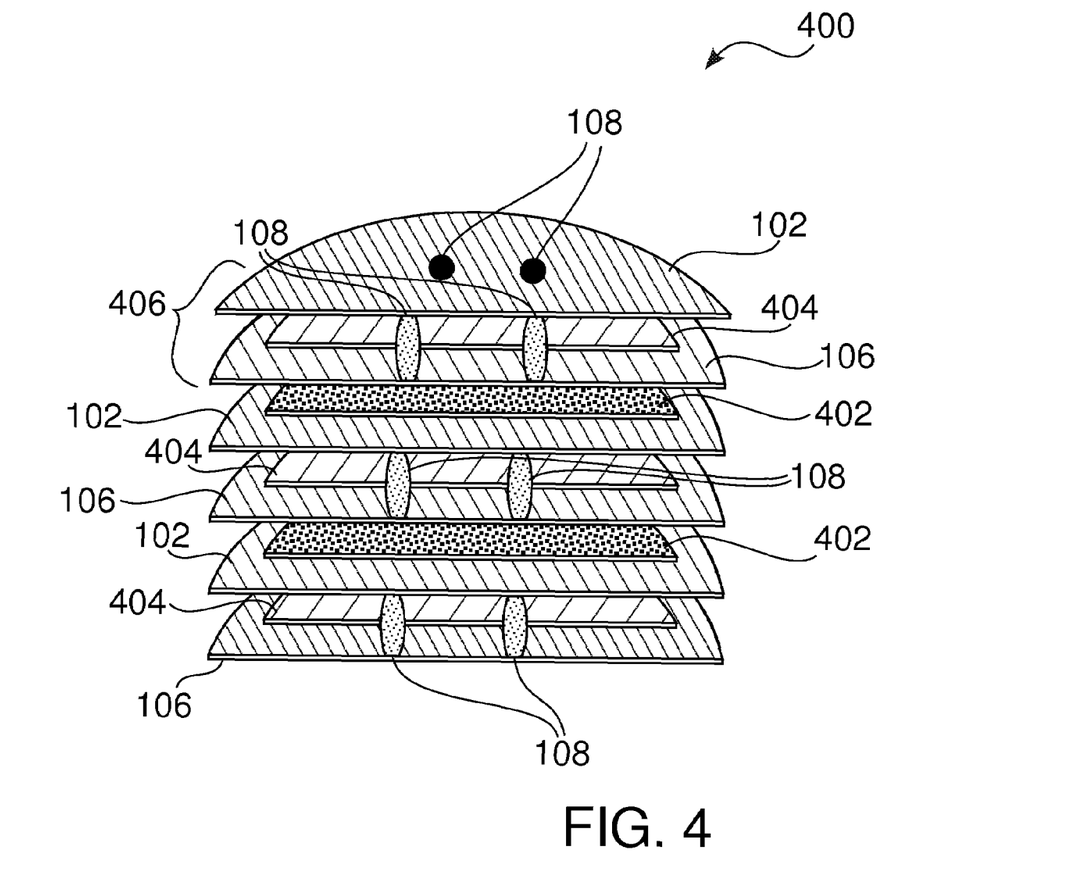
FIG. 4 shows a temporarily bonded flat, stacked electrolytic capacitor configuration.

Electrode assemblies 100, 200 and 300 can be used to create flat stacked electrolytic capacitor configurations 400, as shown in FIG. 4. Suitably, such electrolytic capacitor configurations are constructed by stacking a first separator layer 102, a cathode 404 and a second separator layer 106, to create enclosed cathode assembly 406. Temporary bonds 108 bond the separator layers 102 and 106 to each other, and/or to cathode 404. One or more anodes 402 are then disposed adjacent enclosed cathode assembly 406, but with separator layers 102 and 106 not allowing the cathode 404 and anode 402 to touch. As discussed throughout, anode 402 can comprise one or more separate anode foil layers or a folded anode assembly. Suitably, anode 402 will comprise three or more anode foils, either separate, or joined with a foldable connection and folded as disclosed in U.S. patent application Ser. No. 11/244,956, filed Oct. 5, 2005. An electrolytic capacitor can be prepared by stacking a plurality (e.g., 2, 3, 4, 5, 6, 7, 8, 9, 10, etc.) of units comprising enclosed cathode assembly 406 and anode 402 (suitably comprising 2, 3, 4, 5, 6, 7, 8, etc. anode foils or a folded anode assembly). Each cathode 404 is connected together to allow for electrical interconnection, and can suitably connected to the bottom of the housing and/or to the lid enclosing the housing. Each of the anodes 402 are also connected together to achieve electrical interconnection. The illustration in FIG. 4 shows the stacked capacitor configuration 400 having two anode foils and three cathodes, though any suitable number of anodes and cathodes can be used to construct stacked capacitor configuration 400. This finished stack can then be inserted into a case or capacitor housing with a geometry closely following the contour of the stack, and designed to minimize the space occupied inside the finished defibrillator.

Flat, stacked capacitor configuration 400 can be enclosed within a housing enclosed by a lid, for example, as set forth in U.S. Pat. Nos. 5,131,388 and 5,930,109, and U.S. patent application Ser. Nos. 11/031,300, filed Jan. 7, 2005, and 11/031,366, filed Jan. 7, 2005, the disclosures of each of which are incorporated herein by reference in their entireties. The electrolytic capacitor housing can be an aluminum, stainless steel, plastic, or other suitable material container that defines a chamber in which the flat, stacked capacitor configuration 400 is closely received. The chamber will preferably have a depth equal to the thickness of the stack, but may be of any desired configuration.

In embodiments discussed above, the pre-assembled capacitor is then vacuum impregnated with an electrically conductive electrolyte, by placing the capacitor in contact with the electrolyte and reducing the pressure to less than 50 cm Hg. The capacitor electrolyte will suitably be ethylene glycol-based or diethylene glycol-based with a straight chain dicarboxlyic acid and/or boric acid. Other suitable electrolytes include those known to the ordinarily skilled artisan, including those disclosed in U.S. Pat. No. 5,496,481 to Liu, U.S. Pat. No. 5,507,966 to Liu, U.S. Pat. No. 5,687,057 to Dapo and U.S. Pat. No. 6,587,329 to Feger, the disclosures of each of which are incorporated herein by reference in their entireties. Any suitable electrolyte that substantially dissolves the temporary bonds between the separator layers and/or the separator layers and the electrodes can be used. The electrolyte is suitably neutralized with ammonia or an amine and a cathode depolarizer, typically a nitro-aromatic compound such as nitrobenzene, nitroacetophenone, or nitroanisole, may be added to the electrolyte to improve the gas evolution behavior of the titanium cathode. Suitably, a cathode depolarizer is added in the range of about 0 to about 5% by weight. For example, a cathode depolarizer will be added at about 1% by weight. The capacitor is held at this low pressure for 5 to 45 minutes and then pressure is restored, using the pressure to force the electrolyte mixture into the capacitor stack.

The capacitor is then removed and placed in an oven at a temperature of about 65° C. to about 90° C. and a maximum oxygen atmospheric concentration of 2% for a period of about 2 hours to about 24 hours. At the end of this process, any temporary bonds within the capacitor will have been substantially dissolved such that the temporary adhesive, e.g., PEG, has dissolved into the solvent-based electrolyte. The capacitor is then aged in a normal manner by applying the working voltage to the capacitor, allowing the capacitor to reach this voltage, and then allowing the current to decrease.

Electrolytic capacitors described throughout can be incorporated into implantable medical devices, such as implantable cardioverter defibrillators (ICDs), as would be apparent to one skilled in the art, as described in U.S. Pat. No. 5,522,851, incorporated herein by reference in its entirety.

Figure 5A:
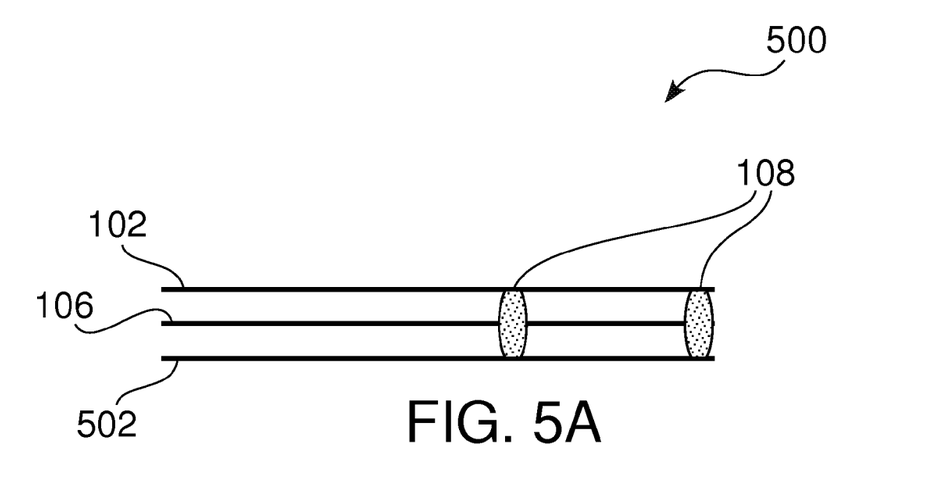
FIG. 5A shows separator material sheets temporarily bonded to each other prior to cutting.
Figure 5B:
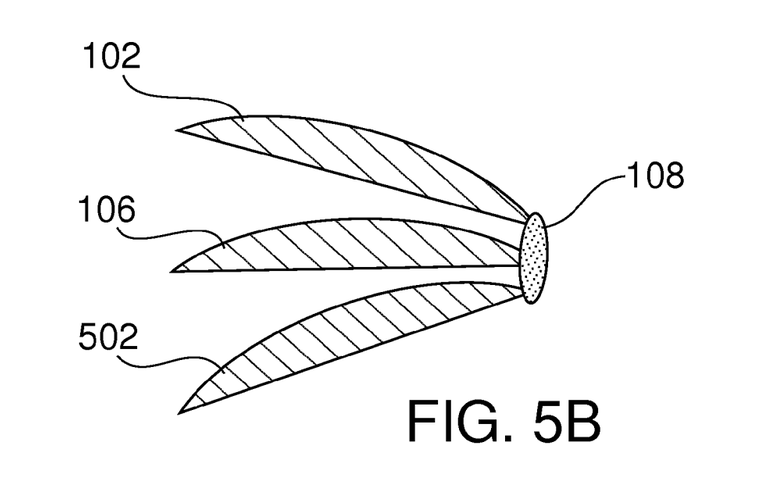
FIG. 5B shows separator material sheets temporarily bonded to each other after cutting.

In another embodiment, FIG. 5A shows separator layers 102, 106, 502 temporarily bonded to each other prior to cutting. Any suitable cutting process can be utilized to cut the separator layers, e.g., dye cutting, laser cutting and the like. Separator layers 102, 106 and 502 can be bonded together at any number of points, e.g., 1, 2, 3, 4, 5, etc. Suitably, multiple layers of separator material, e.g., 2, 3, 4, 5, 6, 7, 8, 9, 10, etc. are stacked on top of each other and a sufficient amount of temporary adhesive, 10's to 100's of □L, is applied to the separator material such that the adhesive seeps through the layers and creates a temporary bond between each layer. Then, the layers can be cut into the appropriate shapes (e.g., half-circle shapes), while still maintaining one or more areas of temporary bond between them. FIG. 5B shows separator material temporarily bonded to each other after cutting, where the individual half-circle shaped separator layers (102, 106, 502) are temporarily bonded to each other at one temporary bond 108 (though multiple bonding points can be used). When these separator materials are placed in a suitable solvent-based electrolyte, the temporary bond(s) is substantially dissolved into the electrolyte, leaving free separator layers (though generally tightly stacked in an electrolytic capacitor configuration). As would be apparent to one of ordinary skill in the art, one or more anode or cathode electrodes can be disposed between the temporarily bonded separator layers to form a flat stacked capacitor configuration.

Figure 6:
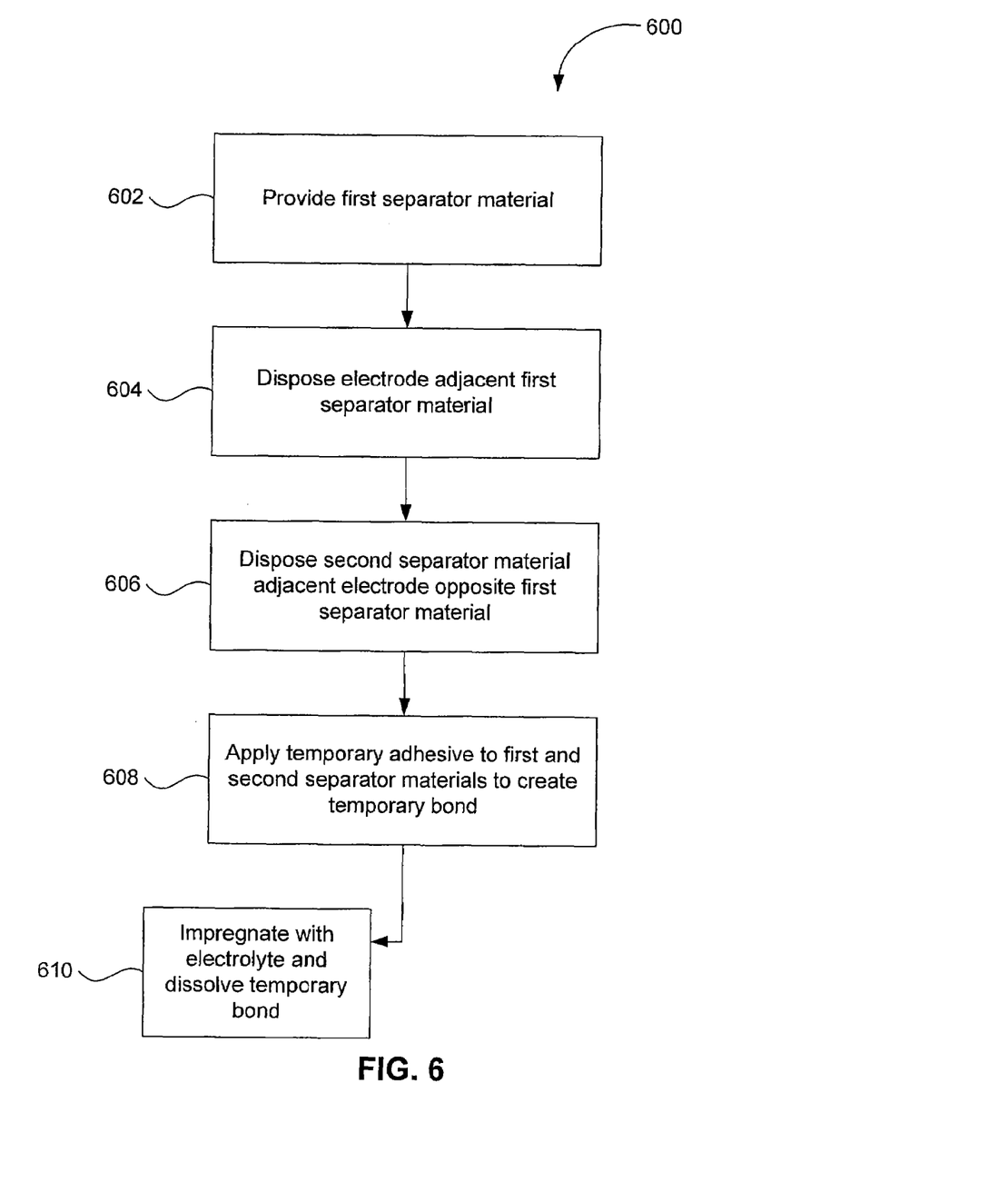
FIG. 6 shows a flowchart of a process for manufacturing an electrode assembly.

Flowchart 600 of FIG. 6 illustrates a process for manufacturing an electrode assembly, with reference to FIGS. 1 and 3. In step 602 of FIG. 6, a first separator material 102, such as shown in FIG. 1, is provided. In step 604 of FIG. 6, one or more electrodes 104 are disposed adjacent the first separator material 102, as shown in FIG. 1. In step 606 of FIG. 6, a second separator material 106 is disposed adjacent the one or more electrodes 104, opposite the first separator material 102, as shown in FIG. 1. In step 608 of FIG. 6, a temporary adhesive is applied to the first 102 and second 104 separator materials to create one or more temporary bonds 108 between the first 102 and second 104 separator materials as shown in FIG. 1. The process illustrated in flowchart 600 can further comprise a step of applying a temporary adhesive to the one or more electrodes 104 to create one or more temporary bonds 108 between the one or more electrodes and the first 102 and/or second 106 separator materials, as shown in FIG. 3. The process illustrated in flowchart 600 of FIG. 6 can also further comprise step 610, impregnating the electrode assembly 100 with a solvent-based electrolyte to substantially dissolve the one or more temporary bonds 108.

Figure 7:
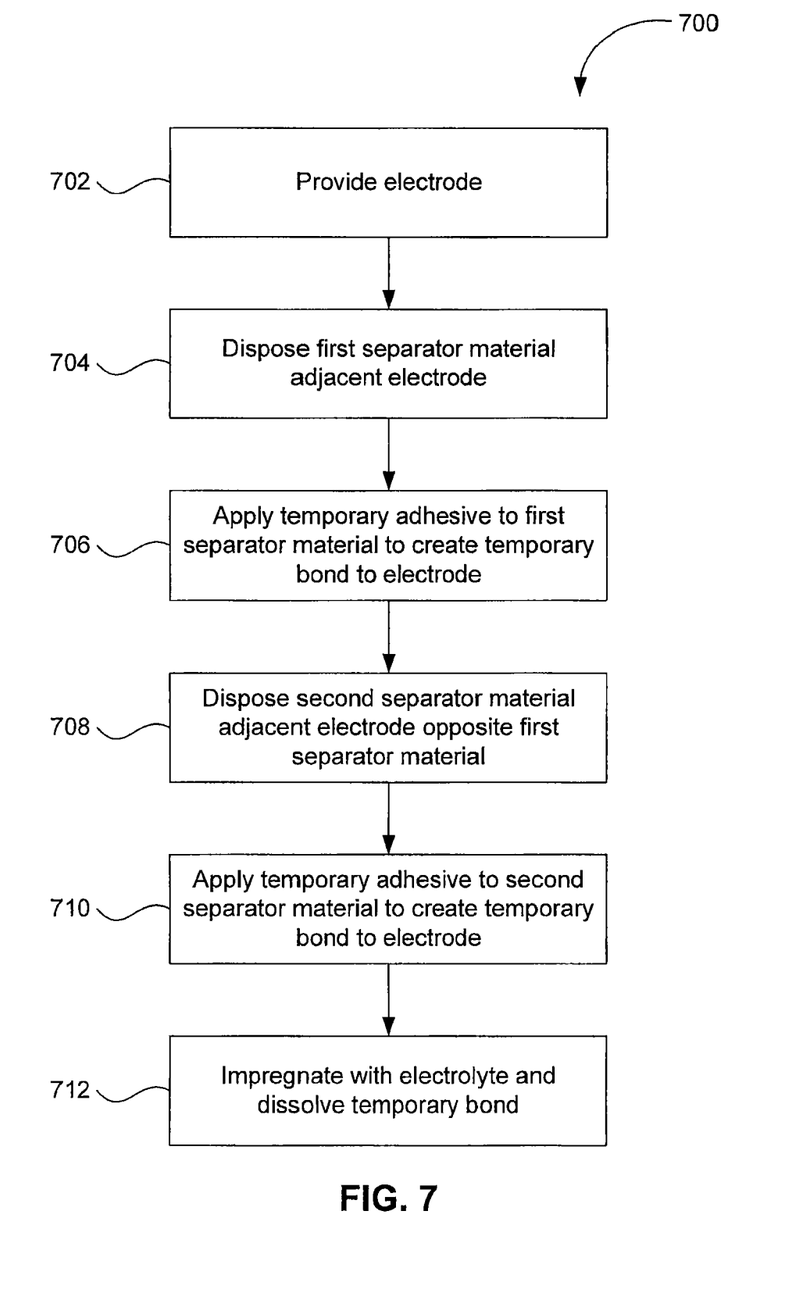
FIG. 7 shows a flowchart of a process for manufacturing an electrode assembly.

Flowchart 700 of FIG. 7 illustrates a process for manufacturing an electrode assembly, with reference to FIG. 2. In step 702 of FIG. 7, one or more electrodes 104, as shown in FIG. 2, are provided. In step 704 of FIG. 7, a first separator material 102 is disposed adjacent the one or more electrodes, 104, as shown in FIG. 2. In step 706 of FIG. 7, a temporary adhesive is applied to the first 102 separator material to create one or more temporary bonds 108 between the first 102 separator material and the one or more electrodes 104, as shown in FIG. 2. In step 708 of FIG. 7, a second separator material 106 is disposed adjacent the one or more electrodes 104, opposite the first separator material 102, as shown in FIG. 2. In step 710 of FIG. 7, a temporary adhesive is applied to the second separator material 106 to create one or more temporary bonds 108 between the second separator material 106 and the one or more electrodes 104 as shown in FIG. 2. The process illustrated in flowchart 700 of FIG. 7 can also further comprise step 712, impregnating the electrode assembly 100 with a solvent-based electrolyte to substantially dissolve the one or more temporary bonds 108.

Figure 8:
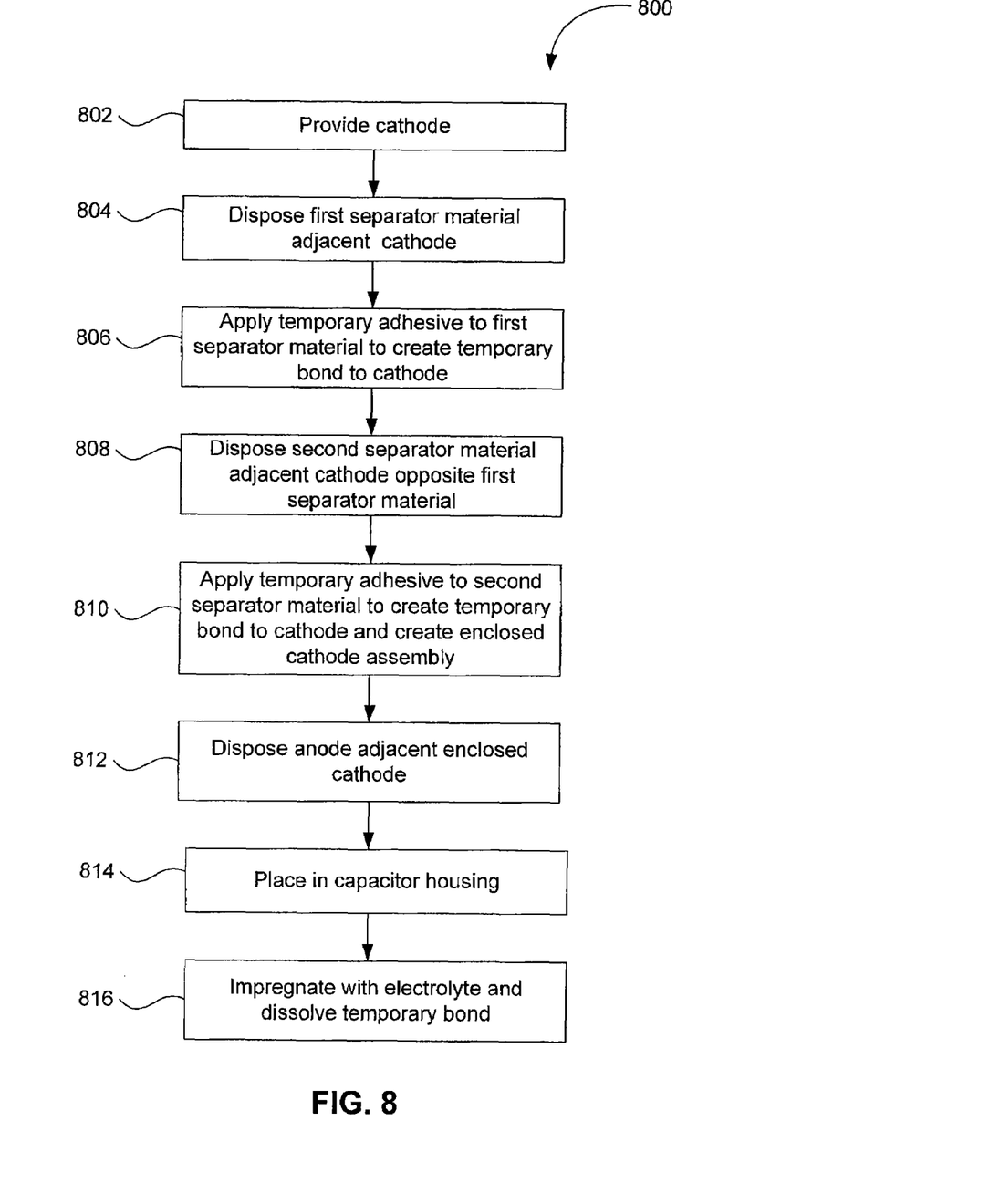
FIG. 8 shows a flowchart of a process for manufacturing an electrolytic capacitor.

Flowchart 800 of FIG. 8 illustrates a process for manufacturing an electrolytic capacitor 400, with reference to FIG. 4. In step 802 of FIG. 8, cathode 404, as shown in FIG. 4, is provided. In step 804 of FIG. 8, a first separator material 102 is disposed adjacent cathode 404, as shown in FIG. 4. In step 806 of FIG. 8, a temporary adhesive is applied to the first 102 separator material to create one or more temporary bonds 108 between the first 102 separator material and the cathode 404, as shown in FIG. 4. In step 808 of FIG. 8, a second separator material 106 is disposed adjacent cathode 404, opposite the first separator material 102, as shown in FIG. 4. In step 810 of FIG. 8, a temporary adhesive is applied to the second separator material 106 to create one or more temporary bonds 108 between the second separator material 106 and cathode 404 to create an enclosed cathode assembly 406, as shown in FIG. 4.

In alternative embodiments, the process illustrated in flowchart 800 of FIG. 8 can also further comprise a step of applying a temporary adhesive to the first 102 and second 106 separator layers to temporarily bond the first and second materials to each other at least one temporary bond 108, as shown in FIG. 4. In step 812 of FIG. 8, one or more flat anode foils 402 are disposed adjacent the enclosed cathode assembly 406, as shown in FIG. 4. The process illustrated in flowchart 800 of FIG. 8 can also further comprise step 814 of placing the electrolytic capacitor on a capacitor housing. The process illustrated in flowchart 800 of FIG. 8 can also further comprise step 816 of impregnating the electrolytic capacitor 400 with a solvent-based electrolyte to substantially dissolve the one or more temporary bonds 108.

While various embodiments have been described above, it should be understood that they have been presented by way of example only, and not limitation. Thus, the breadth and scope of this disclosure should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the embodiments that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for manufacturing an electrode assembly comprising:
   (a) providing a first separator material;
   (b) disposing at least one electrode adjacent said first separator material;
   (c) disposing a second separator material adjacent said at least one electrode and opposite said first separator material, whereby said at least one electrode is disposed between said separator materials; and
   (d) applying a temporary adhesive to said first and second separator materials, whereby said first separator material and said second separator material are temporarily bonded to each other at least one point by said temporary adhesive.

2. The process of claim 1, further comprising applying a temporary adhesive to said at least one electrode, wherein at least one of said separator materials is also temporally bonded to said at least one electrode at least one point.

3. The process of claim 1, further comprising impregnating said electrode assembly with an ethylene glycol based electrolyte, wherein said temporary adhesive is substantially dissolved.

4. The process of claim 1, wherein said at least one electrode comprises at least one flat cathode foil.

5. The process of claim 1, wherein said at least one electrode comprises at least one flat anode foil.

6. The process of claim 1, wherein said temporary adhesive dissolves substantially in a solvent based electrolyte solution.

7. The process of claim 1, wherein said temporary adhesive comprises poly(ethylene glycol).

8. The process of claim 1, wherein said temporary adhesive comprises poly(vinyl alcohol).

9. The process of claim 1, wherein said temporary adhesive comprises a polymeric adhesive soluble in an ethylene glycol based electrolyte.

10. The process of claim 1, wherein said separator material is selected from the group consisting of paper, a paper-polymer blend material, and a polymeric material.

11. A process for manufacturing an electrode assembly comprising:
(a) providing at least one electrode;
(b) disposing a first separator material adjacent said at least one electrode;
(c) applying a temporary adhesive to said first separator material, whereby said first separator material is temporarily bonded to said at least one electrode at least one point;
(d) disposing a second separator material adjacent said at least one electrode and opposite said first separator material, whereby said at least one electrode is disposed between said separator materials; and
(e) applying a temporary adhesive to said second separator material, whereby said second separator material is temporarily bonded to said at least one electrode at least one point by said temporary adhesive.

12. The process of claim 11, further comprising impregnating said electrode assembly with an ethylene glycol based electrolyte, wherein said temporary adhesive is substantially dissolved.

13. The process of claim 11, wherein said temporary adhesive comprises poly(ethylene glycol).

14. The process of claim 11, wherein said temporary adhesive comprises poly(vinyl alcohol).

15. The process of claim 1, wherein said temporary adhesive comprises a polymeric adhesive soluble in an ethylene glycol based electrolyte.

16. The process of claim 1, wherein said separator material is selected from the group consisting of paper, a paper-polymer blend material, and a polymeric material.

17. A process for manufacturing an electrolytic capacitor, comprising:
(a) providing a flat cathode foil;
(b) disposing a first separator material adjacent said flat cathode foil;
(c) applying a temporary adhesive to said first separator material, whereby said first separator material is temporarily bonded to said flat cathode foil at least one point by said temporary adhesive;
(d) disposing a second separator material adjacent said flat cathode foil and opposite said first separator material, such that said flat cathode foil is disposed between said separator materials;
(e) applying a temporary adhesive to said second separator material, whereby said second separator material is temporarily bonded to said flat cathode foil at least one point by said temporary adhesive, wherein said flat cathode foil and said separator materials create an enclosed cathode assembly;
(f) disposing at least one flat anode foil adjacent said enclosed cathode assembly, wherein said separator materials prevent said flat anode foil from contacting said flat cathode foil, and wherein said flat anode foil and said enclosed cathode assembly create a flat stacked capacitor construction.

18. The process of claim 17, further comprising applying a temporary adhesive to said first and second separator materials, whereby the first and second materials are temporarily bonded to each other at least one point by said temporary adhesive.

19. The process of claim 17, further comprising placing said flat stacked capacitor construction in a housing.

20. The process of claim 17, further comprising impregnating said flat stacked capacitor construction with an ethylene glycol based electrolyte, wherein said temporary adhesive is substantially dissolved.

* * * * *